Nov. 17, 1964        E. L. WALTERS        3,157,005
APPARATUS FOR SURFACING GLASS
Filed March 24, 1961
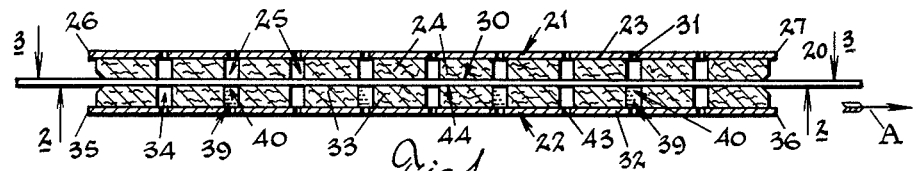
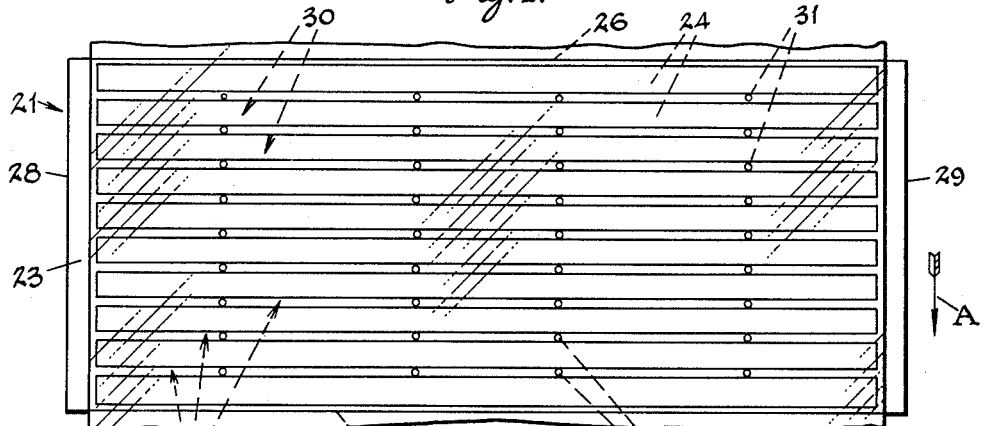
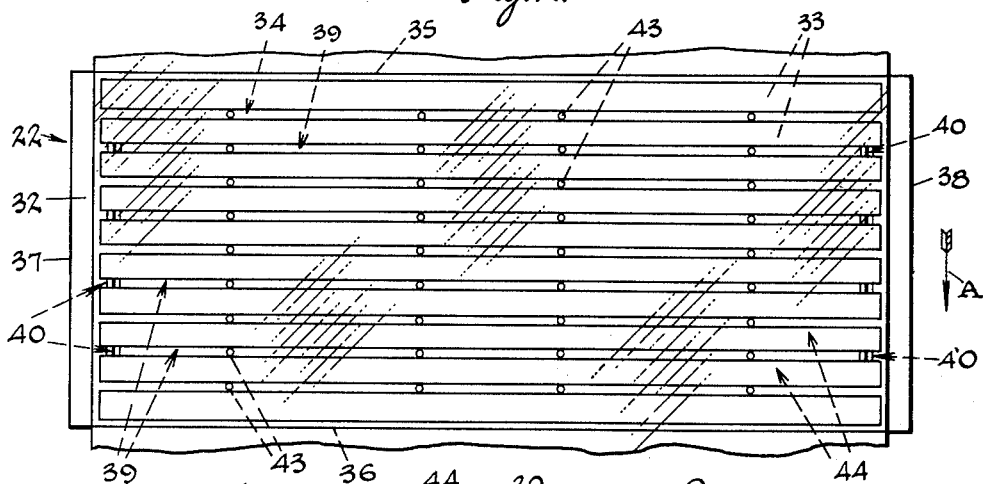
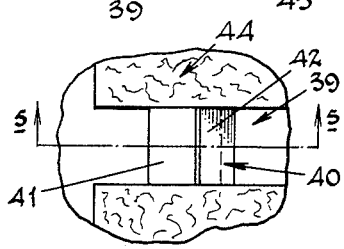
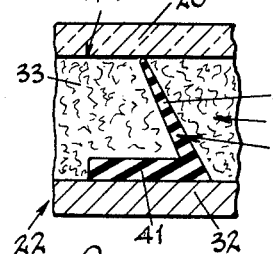
INVENTOR.
Emmett L. Walters
BY
Nobbe & Swope
ATTORNEYS _United States Patent Office_

3,157,005
Patented Nov. 17, 1964

3,157,005
APPARATUS FOR SURFACING GLASS
Emmett L. Walters, Toledo, Ohio, assignor to Libbey-Owens-Ford Glass Company, Toledo, Ohio, a corporation of Ohio
Filed Mar. 24, 1961, Ser. No. 98,068
1 Claim. (Cl. 51—112)

This invention relates broadly to an apparatus for surfacing glass and, more particularly, to an improved pair of opposed polishing runners or platens which are especially adapted for cooperative, simultaneous and uniform polishing of both surfaces of a glass sheet or ribbon moving therebetween along a substantially horizontal path.

It has been known that a continuous glass ribbon may be ground and/or polished simultaneously on both surfaces as the ribbon moves along a definite path. This operation has been referred to in the prior art as twin grinding and twin polishing. In the prior art, twin grinding was usually accomplished by a series of opposed circular grinding runners rotatable about centrally disposed axes on opposite sides of the glass ribbon. In a similar manner, the twin polishing devices of the prior art employ a plurality of circular polishing pads freely rotatable about their individual axes with the plurality of pads being supported on each side of the glass ribbon from a common frame that is itself rotated about an axis perpendicular to the plane of the glass.

It has been further known, as shown and described in U.S. Patents Nos. 1,962,766 and 1,962,767, to surface (i.e. grind or polish) the opposed surfaces of a glass sheet moving along a horizontal path by a special type of oscillating motion of the surfacing tool, wherein the tool includes upper and lower generally rectangular surfacing runners or platens extending substantially the full width of the sheet.

The particular motion of the surfacing tools typified by the above patents is most aptly defined as a curvilinear translation with respect to the glass. This curvilinear translation is itself most particularly characterized by the fact that the path of each point on the tool describes a circle, which circle is of equal diameter to the circles described by all other points on the same tool.

According to the prior art in which rotating circular tools were employed, and particularly during the grinding process, the distribution of the grinding slurry to bring the slurry into proper position between a grinding runner and the glass was normally accomplished by inscribing a series of radially spiralling grooves in the runner face. In this case, the slurry would be introduced through an opening at the center of the rotating runner and by centrifugal force would be carried along the outwardly spiralling channels or grooves so that the slurry would be distributed uniformly across the glass sheet.

In the case of polishing, the slurry was normally deposited directly upon the glass and was carried by the glass beneath the polishing tools which included circular pads of fairly restricted diameter so that the slurry or polishing rouge only had to travel a relatively small distance beneath the pad to reach the center thereof and thereby insure uniform distribution of the slurry beneath the pad.

With the advent of present polishing procedures wherein, as previously mentioned, rather large rectangular runners are used to surface the glass, a serious problem has arisen in connection with the proper distribution of the slurry beneath the glass contacting area of the surfacing runner which is magnified in the case of the rectangular polishing runners following a path characterized by a curvilinear translation. This problem is especially acute where twin polishing with such curvilinear translation is attempted because of the extreme difficulty of maintaining a proper slurry distribution simultaneously over both the upper and lower surfaces of the glass sheet, this being due in the main to the fact that the polishing runners must be pressed against the glass surfaces by some external pressure in order to secure the best polishing action. This being the case, external feeding such as was common heretofore in the case of the polishing pads of the prior art is not feasible. Further, while the use of internal feeding of the polishing slurry, i.e. feeding the slurry interiorly of the runners and then into contact with the portions of the glass sheet passing thereunder, when employing two opposed and substantially identical rectangular surfacing runners such as disclosed in the aforementioned patents is satisfactory for certain purposes, the apparatus of the present invention has proven to be of particular utility and has important advantages not available in the structure disclosed in these patents.

It is, therefore, the principal object of the present invention to provide an improved glass surfacing apparatus.

Another object of the invention is to provide an apparatus which is effective to simultaneously, efficiently and uniformly polish both surfaces of a glass sheet moving along a substantially horizontal path.

More particularly, it is a further object of the invention to provide a pair of opposed upper and lower polishing runners between which the glass sheet to be polished travels in a substantially horizontal path, in each of which runners a series of grooves or polishing slurry distribution channels are arranged and specifically designed to cooperate and provide a highly effective and efficient uniform polishing of the opposite surfaces of the glass sheet.

Other objects and advantages of the invention will become more apparent during the course of the following description when taken in connection with the accompanying drawings.

In the drawings, wherein like numerals are employed to designate like parts throughout the same:

FIG. 1 is a longitudinal cross sectional view of a pair of opposed, cooperating runners in accordance with the invention;

FIG. 2 is a plan view of the bottom surface or working face of the upper polishing runner, taken looking through a glass sheet being polished as indicated by the line 2—2 of FIG. 1;

FIG. 3 is a plan view of the upper surface or working face of the lower polishing runner taken looking through a glass sheet being polished as indicated by the line 3—3 of FIG. 1;

FIG. 4 is a fragmentary plan view, shown on an enlarged scale, of the end of one of the lower runner grooves or channels illustrated in FIGS. 1 to 3; and FIG. 5 is an enlarged, fragmentary cross sectional view taken along the line 5—5 of FIG. 4.

Briefly stated, the present invention provides an improved glass surfacing apparatus including a pair of opposed, upper and lower surfacing tools, both of which comprise generally rectangular polishing runners having working faces adapted for engagement with the upper and lower surfaces respectively of a glass sheet moving horizontally therebetween. The working face of each runner is provided with a plurality of parallel grooves extending longitudinally from one end to the opposite end thereof and transversely of the direction of travel of the glass sheet, which grooves communicate with a source of liquid polishing medium. However, while the grooves of the upper polishing runner extend throughout the length of the working face thereof and are of substantially uniform width, at least a portion of the grooves of the lower runner are of restricted area or are provided with means adjacent their extremities which are effective to restrict the rate at which the polishing medium will escape therefrom. It has been discovered that the provision of opposed polishing runners constructed in the above manner results in the attainment of a unique cooperation therebetween which enables a smooth and uniform, simultaneous polishing of both surfaces of the glass sheet to be effected.

Referring now to the drawings, and in particular to FIGS. 1 to 3, there is shown a continuous glass sheet 20 being conveyed in the direction of arrow A. The sheet 20 is shown passing between a pair of opposed surfacing tools which include upper and lower generally rectangular polishing runners or platens 21 and 22, respectively. The runners 21 and 22 are attached to and driven by suitable eccentric drive mechanisms or units (not shown) in such a manner that a curvilinear translation is imparted thereto. It should be noted that in actual practice a number of these opposed pairs of surfacing runners, spaced along the direction of travel of the sheet to be polished, would be employed.

The upper polishing runner 21 comprises a rigid backing plate 23 preferably constructed of a metal such as cast iron or steel to which is secured in any suitable manner a pad 24 composed of felt, soft rubber or other similar, somewhat resilient material to provide the working face of the surfacing runner. In accordance with the invention, this working face of the runner 21 is provided with a plurality of grooves or channels 25 cut into the pad 24 and arranged substantially parallel to one another and to the long sides 26 and 27 of the runner. These grooves also extend completely through the pad 24 from one end 28 of the runner to the opposite end 29 thereof, with the ends of the grooves being open.

The grooves 25 are also of substantially uniform width along their length and together form the polishing slurry distribution means for the upper runner. The working face of the upper runner 21 is, therefore, made up of adjoining ridges 30 and valleys, the valleys being formed by the grooves 25, wherein every two adjacent valleys are spaced from each other by a ridge, the ridges 30 forming in essence the actual polishing surface of the runner. As shown in the drawings, the runner 21 is disposed so that the grooves 25 are arranged perpendicular to the direction of movement of the glass sheet 20.

Each groove 25 is provided with one or a series of inlet ports 31 provided in the backing plate 23 and communicating with the grooves 25. The inlet ports 31 communicate with a suitable source of polishing fluid or slurry (not shown), whereby such fluid is forced under pressure through the ports 31 into the grooves 25 and outwardly between the upper surface of the glass sheet 20 and the working face of the runner 21.

As previously mentioned, the grooves or channels 25 extend completely throughout the length of the pad 24 and are therefore open ended, as is best seen by reference to FIG. 2. It has been discovered that insofar as the upper runner 21 is concerned, an excellent polishing slurry distribution is obtained, completely over the upper surface of the glass sheet traveling thereunder, with the use of the open-ended grooves as shown. Of course, there will also be a continuous flow of the polishing slurry from the open ends of the grooves.

Now it has been found that due apparently to the different polishing demands imposed by the existence of varying conditions on the upper and lower surfaces of the glass sheet when attempting to polish both surfaces simultaneously with a curvilinear translation, the use of opposed platens having identical slurry distribution channels does not produce in all instances a completely uniform and, therefore, satisfactory polishing. Although the precise reasons for this inability to obtain completely satisfactory polishing when employing an opposed lower polishing runner or platen which is exactly similar to the upper runner are not fully understood, it has been discovered that the provision of means which are effective to restrict the cross sectional area of at least a portion of the grooves of the lower runner adjacent the outer extremities thereof is operative and effective to overcome this difficulty and provides, in combination with the uniform width, open-ended grooves of the upper platen or runner, a highly efficient polishing apparatus.

In this respect, one such lower runner construction which has been found to provide excellent results in accordance with the invention is illustrated in FIGS. 3 to 5 and designated by the numeral 22. The lower runner 22 comprises a rigid backing plate 32 to which a pad 33 of felt or the like is secured in any suitable manner to provide the working face of this surfacing runner. The working face of the lower runner 22, somewhat similarly to the working face of the opposed upper runner 21, is provided with a plurality of grooves or channels 34 cut into the pad 33 so as to be substantially parallel to the longitudinal edges 35 and 36 of the runner, such grooves being of uniform width along their length and extending completely through the pad 33 from one end 37 of the runner to the other end 38 thereof, with the ends of the grooves being open. In addition to the grooves 34, a number of grooves 39 are provided in the working face, which grooves 39 are also disposed substantially parallel to the long sides 35 and 36 of the runner 22, and communicate with the transverse edges or ends 37 and 38 thereof; however, in these grooves means are provided for restricting the flow of polishing medium from the ends thereof. This restriction of the grooves 39 is accomplished according to the invention by providing a generally V-shaped resilient member, indicated generally at 40, at each end of the grooves 39. The member 40 comprises a relatively thick base portion 41 and a slightly tapered portion 42, the portion 42 being integral with the base portion 41 and extending obliquely upwardly and outwardly so as to form an acute angle with said base portion. Both the base portion 41 and the angled portion 42 of the member 40 have substantially the same width as that of the groove 39, with the portion 42 additionally being of a height substantially equal to the depth of the groove 39. The base portion 41 is secured to the backing plate 32 by any suitable means and positioned so as to extend generally normal to the length of the groove 39. Now, while it will be readily appreciated that the member 40 restricts the flow of polishing medium from the grooves 39, its construction is also such as to enable its deflection downwardly from the surface of the glass sheet being polished and this is very important since a certain amount of flow of the polishing medium through the grooves 39 is necessary.

In the above connection, it has been found to be extremely important that the areas of the glass surfaces being polished also be properly cooled during such polishing. This cooling is necessary in order to alleviate the very appreciable heat build-up caused by friction resulting from the continuous rubbing contact of the polishing runners or platens with the ribbon surfaces, which heat build-up would otherwise hinder and, in some instances, even make completely impossible, the attainment of a satisfactory polish. It has been found that in order to satisfactorily cool the glass surfaces, a good circulation of the polishing medium is essential. In this respect, the employment of closed grooves in the working faces of the runners is not satisfactory since it does not permit a satisfactory circulation and cooling. In addition, the use of closed grooves in the lower polishing runners has been found to create a pressure build-up therein by the polishing medium, which, at the desired high speed operation of the polishing apparatus, tends to lift the glass ribbon off the lower runner. Further, the employment of only open grooves, while enabling an excellent circulation and cooling in the upper runner, has not been found satisfactory for the lower runner. This is believed to be due to the fact that a sufficient static head or pressure of polishing medium is not attained in the lower groove which would force the medium between the ridges of the runner working face and the glass surface.

However, it has been discovered that the provision of a plurality of grooves in the working face of the lower runner which include means at the ends thereof to restrict the flow of polishing medium while still permitting flow of the polishing medium therethrough, enables both excellent polishing and cooling conditions to exist on the bottom surface of the glass sheet and, together with the open grooves of the upper runner, enables a highly uniform polishing of both surfaces to be obtained simultaneously. In this connection, it is thought that the turbulence produced by the restriction of certain of the grooves in the bottom runner is just sufficient to enable a satisfactory pressure head to be built up in the grooves to force a proper quantity of the polishing medium between the ridges and glass surface while yet still permitting some of the polishing medium to flow outwardly of the grooves at either end of the runner to insure a continuous flow thereof longitudinally through the grooves.

Each of the grooves 34 and 39 is provided with a plurality of inlet ports 43 which extend therein through the backing plate 32. These inlet ports communicate with a suitable source of polishing fluid or slurry (not shown) whereby substantially an even quantity of fluid is supplied under pressure to each groove, forced therethrough and outwardly between the lower surface of the glass sheet 20 and the working face of the runner 22.

It will be noted that grooves 34 and 39 are spaced across the width of the working face of the runner 22 so that each groove 34 is separated from the next adjacent groove 34 by a groove 39 as well as by a pair of ridges 44. As in the case of the upper runner 21, these ridges 44 form the actual polishing surface of the runner. Although this alternate arrangement of open and restricted grooves has been found to provide a preferred embodiment of the invention, satisfactory results may also be obtained where as high as three of the unrestricted open-ended grooves 34 are provided for each groove 39. Raising the ratio of unrestricted grooves to restricted grooves above about 3 to 1, however, decreases to some extent the efficiency of the polishing action obtained. In a similar respect, as high as three restrictive grooves to one unrestricted groove may be provided and still obtain satisfactory results in accordance with the invention, but higher ratios than about 3 to 1 in this connection have also been found to diminish the effective polishing action desired. In both of the above respects, no more than the number of grooves determining the high end of the ratio should be provided consecutively across the pad, e.g. with ratios of 3 to 1, the grooves should still be alternating in this ratio or below, that is, not more than three of the same type of grooves being adjacent to each other.

It should be noted here that the exact percent reduction in cross sectional area of the grooves 39 as provided by the restrictive means member 40 is not of particular significance so long as some restriction is made. Excellent results in this respect have been obtained with a reduction of more than 50 percent, although this is by no means controlling and will depend to some extent upon the particular polishing action desired. In this connection, satisfactory results have been obtained, particularly when employing very high polishing speeds, with reductions as little as 25 percent. Also, the precise ratio of the width of the polishing or glass contacting surfaces or the ridges 30 and 44 to the width of the grooves 25 and 39 is not extremely critical although good results have been obtained in this regard with ratios of 3 to 5:1.

It has been found that the employment of a member such as illustrated at 40 provides an extremely effective restrictive means in accordance with the invention for insertion in at least a portion of the grooves of the lower polishing platen in that it functions as a type of pressure release valve wherein the pressure imposed by the polishing medium or fluid acts to deflect the upstanding portion 42 thereof away from the glass surface 30 upon such pressure reaching a predetermined value, thus creating an escape or discharge space for the fluid. In this manner then, any suitable desired pressure can be maintained within the grooves 39 merely by proper selection of the material from which the V-shaped members 40 are constructed, i.e. as to the rigidity thereof, since the size of the opening or space between the portion 42 of the member 40 and the glass surface is directly proportional to the pressure imposed by the polishing medium.

It will be appreciated from the above that the present invention provides a novel and extremely effective polishing apparatus, the use of which has been found to enable a uniform polishing action to be obtained simultaneously on the opposed surfaces of a glass sheet.

I claim:

In apparatus for simultaneously polishing the opposite surfaces of a glass sheet, the combination including a pair of opposed upper and lower surfacing tools between which said glass sheet travels in a substantially horizontal path, said upper surfacing tool comprising a generally rectangular upper polishing runner having a working face adapted for engagement with the upper surface of the glass sheet and said lower surfacing tool comprising a generally rectangular lower polishing runner having a working face adapted for engagement with the lower surface of the glass sheet, a plurality of generally parallel grooves provided in the working face of each of said polishing runners and extending longitudinally of said runners and transversely of the direction of travel of the glass sheet therepast, the grooves in both of said runners being open at their opposite ends with the grooves in the upper polishing runner extending throughout the length of the working face thereof and being of substantially uniform width throughout, means for introducing a polishing medium under pressure to the grooves of both the upper and lower polishing runners, and means communicating with the ends of at least a portion of the grooves in the working face of said lower polishing runner for restricting the rate at which the polishing medium will escape from said grooves, said restriction means comprising a member positioned in the groove adjacent each end thereof and including a portion which extends obliquely upwardly from the bottom of said groove in the direction of the adjacent end thereof, said portion being operable to be deflected away from the lower surface of the glass sheet being polished upon a predetermined pressure being built up in the groove by the polishing medium, whereby a restricted opening is provided between said member and said glass sheet.

References Cited in the file of this patent

UNITED STATES PATENTS

| | | |
|---|---|---|
| 1,962,767 | Crowley et al. | June 12, 1934 |
| 2,291,123 | Wallace | July 28, 1942 |
| 2,577,937 | Waldron et al. | Dec. 11, 1951 |
| 2,699,021 | Laverdisse | Jan. 11, 1955 |
| 2,859,565 | Javaux | Nov. 11, 1958 |
| 2,935,823 | Heymes | May 10, 1960 |
| 2,936,555 | Junge | May 17, 1960 |
| 3,036,410 | Hoyet et al. | May 29, 1962 |